(12) United States Patent
Hassenrik et al.

(10) Patent No.: US 7,393,284 B2
(45) Date of Patent: Jul. 1, 2008

(54) COUNTER TRACK JOINT

(75) Inventors: Ida Hassenrik, Troisdorf (DE); Stephan Maucher, Siegburg (DE); Thomas Weckerling, Lohmar (DE)

(73) Assignee: GKN Driveline International GmbH, Lohmar (DE)

( * ) Notice: Subject to any disclaimer, the term of this patent is extended or adjusted under 35 U.S.C. 154(b) by 192 days.

(21) Appl. No.: 11/370,410

(22) Filed: Mar. 8, 2006

(65) Prior Publication Data

US 2006/0154734 A1    Jul. 13, 2006

Related U.S. Application Data (63) Continuation-in-part of application No. 10/770,191, filed on Feb. 2, 2004, now abandoned.

(30) Foreign Application Priority Data

Feb. 3, 2003    (DE)    ............... 103 04 156

(51) Int. Cl.
*F16D 3/224* (2006.01)
(52) U.S. Cl. ............ 464/145; 464/906; 29/428
(58) Field of Classification Search ......... 464/140, 464/145, 906; 29/428, 898.066, 898.067
See application file for complete search history.

(56) References Cited

U.S. PATENT DOCUMENTS

| | | | |
|---|---|---|---|
| 3,475,924 A * | 11/1969 | Aucktor | ........ 464/145 X |
| 5,509,856 A | 4/1996 | Welschof | |
| 5,616,081 A | 4/1997 | Krude et al. | |
| 5,782,696 A | 7/1998 | Guimbretiere | |
| 6,120,382 A | 9/2000 | Sone et al. | |
| 6,267,682 B1 | 7/2001 | Sone et al. | |
| 6,319,133 B1 | 11/2001 | Schwarzler et al. | |
| 6,368,223 B1 | 4/2002 | Ouchi et al. | |
| 6,431,988 B1 | 8/2002 | Tone | |
| 2005/0192106 A1 * | 9/2005 | Cermak | ........ 464/145 |

FOREIGN PATENT DOCUMENTS

| | | |
|---|---|---|
| DE | 40 31 819 C1 | 3/1992 |
| DE | 100 60 119 | 6/2002 |
| JP | 2001 232 945 | 8/2001 |
| JP | 2001 323 945 A | 11/2001 |

* cited by examiner

*Primary Examiner*—Greg Binda (57) ABSTRACT

A counter track joint having an outer joint part (10), inner joint part (20), a ball cage (30) and torque transmitting balls. First outer tracks and first inner tracks form first pairs of tracks which widen in a first direction, and second outer tracks and second inner tracks form second pairs of tracks which widen in an opposed second direction. The annular cage (30) includes four first and four second circumferentially distributed cage windows which each accommodate one of the balls and which hold the balls in one plane. The second outer ball tracks (12), at one end, include widened, non-contacting assembly portions (13) for inserting balls (32) into the second cage windows from the radial outside, with all the first cage windows already having balls, and with the second cage windows axially projecting from the outer joint part (10) as a result of the joint being over-articulated.

19 Claims, 6 Drawing Sheets

COUNTER TRACK JOINT

CROSS-REFERENCE TO RELATED APPLICATION

This application is a Continuation-In-Part of U.S. patent application Ser. No. 10/770,191 entitled "Counter Track Joint" and filed on Feb. 2, 2004 now abandoned.

TECHNICAL FIELD

The present invention relates to constant velocity joints and, more particularly, concerns constant velocity joint assemblies having improved construction.

BACKGROUND OF THE INVENTION

Constant velocity fixed ball joints in the form of counter track joints, have an outer joint part with outer tracks, an inner joint part with inner tracks, torque transmitting balls which are received in pairs of tracks consisting of outer tracks and inner tracks, and a ball cage with cage windows in which the balls are held in a common plane and are guided on to the angle-bisecting plane when the joint is articulated. In such joints, first outer tracks, together with first inner tracks, form first pairs of tracks whose control angles open in a first axial direction, and second outer tracks, together with second inner tracks, form second pairs of tracks whose control angles open in a second axial direction. The control angles are defined as angles between the tangents at the ball contact points in the tracks when the joint is in the aligned condition. The present invention concerns counter track joints having four first outer tracks and four second outer tracks which alternate and are uniformly circumferentially distributed. In the inner joint part, there are provided four first inner tracks and four second inner tracks which alternate and are uniformly circumferentially distributed. The first outer tracks and the first inner tracks, together, form first pairs of tracks which, when the joint is in the aligned condition, widen in a first direction. The second outer tracks and the second inner tracks, together, form second pairs of tracks which, when the joint is in the aligned condition, widen in an opposite direction. A ball is held in each of the pairs of tracks. The annular cage comprises eight circumferentially distributed cage windows which each accommodate one of the balls and hold the balls, in their entirety, in a common plane by means of their centers.

Counter track joints, in general, are known from DE 100 60 119 A1 of the applicant, wherein the counter track joints are illustrated and described as having six torque transmitting balls. Rzeppa fixed joints with identical pairs of tracks with six torque transmitting balls wherein, for assembly reasons, the cage windows have different circumferential lengths, are described in U.S. Pat. No. 5,509,856 also owned by the applicant herein. From JP 2001 232 945 A, there are known Rzeppa fixed joints with identical pairs of tracks which comprise eight balls and wherein at the outer ball tracks, at the aperture end, there are provided assembly pockets for inserting balls when the joint is over-articulated.

There are certain disadvantages associated with the assembly of constant velocity joints wherein first the outer joint part, cage and inner joint part are joined in one of the ways commonly known. That is, typically, the balls are inserted by over-articulating the joint, i.e. articulating the inner joint part and cage relative to the outer joint part, thus enabling a cage window of the ball cage to project from the outer joint part and permitting a ball to be inserted into the cage window from the radial outside. When the cage windows are already largely filled with balls, the so-called method of over-articulating—because of the relative circumferential movement of the balls in the cage relative to one another—requires a circumferential cage window length which is needed during assembly only, but not under operational conditions of the joint. In other words, the maximum operating angle of articulation does not dictate the cage window length. Rather, the extended cage window length is necessary only for assembly. Such lengthening of the cage windows in the circumferential direction leads to a reduction in the web width between the cage windows in the circumferential direction, and thus to a weakening of the ball cage. Experience shows that, in operation, the cage constitutes a potentially frangible component which should be designed so as to be as strong as possible. Thus, there exists a need for an eight-ball counter track joint having improved cage strength or durability.

SUMMARY OF THE INVENTION

The present invention provides a counter track joint with eight balls wherein the strength of the cage has been increased as compared to known designs. In particular, the present joint provides that, at an aperture of the outer joint part, the second outer ball tracks of the outer joint part comprise widened assembly regions for inserting second balls into second cage windows from the radial outside, while the first cage windows are already fully filled with first balls and with the second cage windows axially projecting from the outer joint part as a result of the joint being over-articulated. These widened assembly regions only contact the balls during assembly, they are not intended to otherwise contact the balls during normal joint operation. Thus, they are referred to herein as widened, non-contacting assembly regions of the second outer ball tracks.

According to a particular embodiment, four first cage windows associated with the first pairs of tracks comprise a greater length (L1) in the circumferential direction than four second cage windows which are associated with the second pairs of tracks and comprise a length (L2) which is adapted to the operating angle of articulation of the joint.

As a result of the inventive widened, non-contacting assembly regions at the ends of the second outer ball tracks, it is possible to insert the balls of a second group of balls when the cage is articulated only slightly beyond the maximum operating angle of articulation relative to the outer joint part. Advantageously, the first cage windows for an already inserted first group of balls need to be increased only slightly beyond their circumferential length required for operational purposes. The cage windows for the second group of balls can comprise a shorter circumferential length because the balls inside these windows are not displaced relative to one another during assembly. During assembly, as the balls of the second group are positioned on the articulation axis of the joint on the one hand, and on the articulation plane of the joint on the other hand, they merely require the minimum length needed for articulation purposes within the operating range of articulation. It is thus possible to widen the webs between the cage windows considerably, thereby increasing the strength of the cage in operation. The load bearing capacity of the inventive joint is thus also increased.

According to a further advantageous embodiment which requires particularly large widened, non-contacting assembly regions, four first cage windows associated with the first pairs of tracks, comprise a length L1 in the circumferential direction. Four second cage windows associated with the second pairs of tracks have a corresponding circumferential lengths L2. The lengths L1, L2 are adapted to the operating angle of articulation of the joint, but also include a small excess dimension. The excess dimension from L1 and L2 can be the same or different. In this embodiment, the assembly process is the same as described above, with one advantage being that the cage can be inserted as desired, relative to the first and second pairs of tracks.

According to another advantageous embodiment which is also illustrated, the outer joint part is provided with a base, at its end which is axially opposed to the aperture. More particularly, a driveshaft can be removably inserted into the inner joint part in this embodiment.

According to a further embodiment which is also illustrated, a driveshaft is firmly connected to the inner joint part and, at the end of the aperture, the inner joint part comprises inwardly recessed track run-outs for the second inner tracks.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 1 shows an inventive joint in a first embodiment:
A) in an axial view of the joint aperture;
B) in a section A-A according to FIG. 1A; and
C) in a longitudinal section B-B according to FIG. 1A.

FIG. 2 shows the inventive joint according to FIG. 1 while the first group of balls is being assembled:
A) in an axial view of the outer joint part;
B) in section B-B according to FIG. 2A; and
C) with the cage shown in the form of an enlarged detail.

FIG. 3 shows the inventive joint while the second group of balls is being assembled:
A) in an axial view of the outer joint part;
B) in the longitudinal section A-A according to FIG. 3A with an enlarged detail X;
C) in the cross-section F-F through the ball cage according to FIG. 3B; and
D) the detail X of FIG. 3B.

FIG. 4 shows a joint according to the state of the art while the second group of balls is being assembled:
A) in an axial view of the outer joint part;
B) in the longitudinal section A-A of FIG. 4A; and
C) in the cross-section F-F through the ball cage according to FIG. 4B.

FIG. 5 shows an inventive joint in a second embodiment in the form of a disc joint:
A) in an axial view of the joint; and
B) in a longitudinal section through the joint.

FIG. 6 shows the joint according to FIG. 5:
A) during the assembly of the second group of balls; and
B) the detail X of FIG. 6A.

DETAILED DESCRIPTION

In the following figures, the same reference numerals are used to refer to the same components in the various views. Also, in the following description, various operating parameters and components are described for several embodiments. These parameters and components are included as examples and are not meant to be limiting.

Figure 1A:
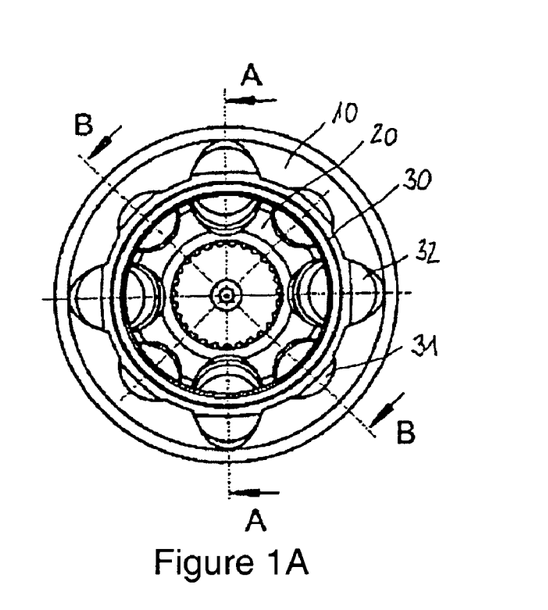
Figure 1B:
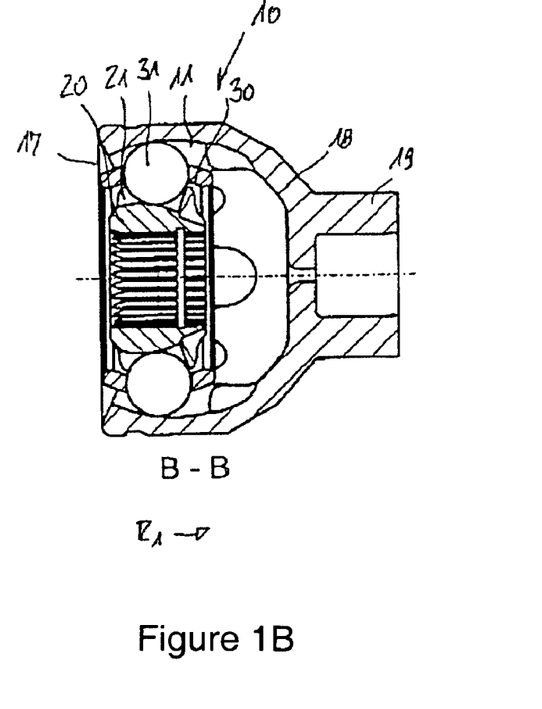
Figure 1C:
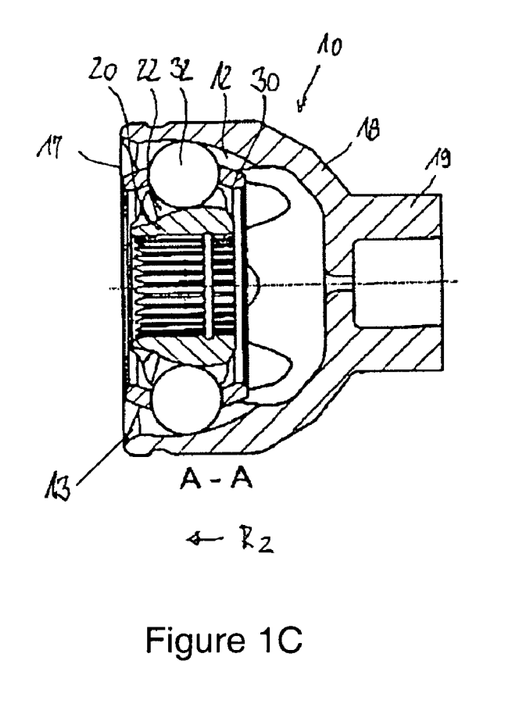

The three individual illustrations of FIG. 1 will be described jointly below. The figures illustrate a constant velocity fixed ball joint and, more particularly, a counter track joint with eight balls. In the embodiment illustrated here, an outer joint part 10 comprises a joint aperture 17 and a base 18 with a formed-on journal 19. The base 19 is axially opposed to the aperture 17. The outer joint part 10 is provided with first outer ball tracks 11 and second outer ball tracks 12, each having four ball tracks being alternately distributed across the circumference. The outer joint part 10 accommodates a ball cage 30 and an inner joint part 20. In the inner joint part 20, first inner ball tracks 21 and second inner ball tracks 22 are alternately circumferentially distributed in the form of four ball tracks each. First outer ball tracks 11 and first inner ball tracks 21 form first pairs of tracks 11, 21. Second outer ball tracks 12 and second inner ball tracks 22 form second pairs of tracks 12, 22. In this example, a driveshaft can be removably inserted into the inner joint part 20. With the joint being in the aligned condition, the first pairs of tracks 11, 21 widen from the aperture 17 towards the base 18 in a first direction R1. The second pairs of track 12, 22, when the joint is in the aligned condition, widen from the base 18 to the aperture 17 in a second direction R2. The first pairs of tracks 11, 21 hold balls 31 of a first group of balls. The second pairs of tracks 12, 22 hold balls 32 of a second group of balls. The balls are held by a ball cage 30 in a common plane, namely in circumferentially extending cage windows (not illustrated in detail) in the ball cage 30.

Figure 2A:
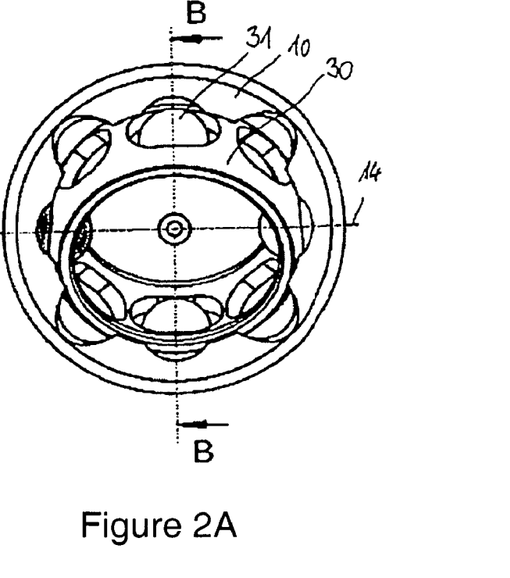
Figure 2B:
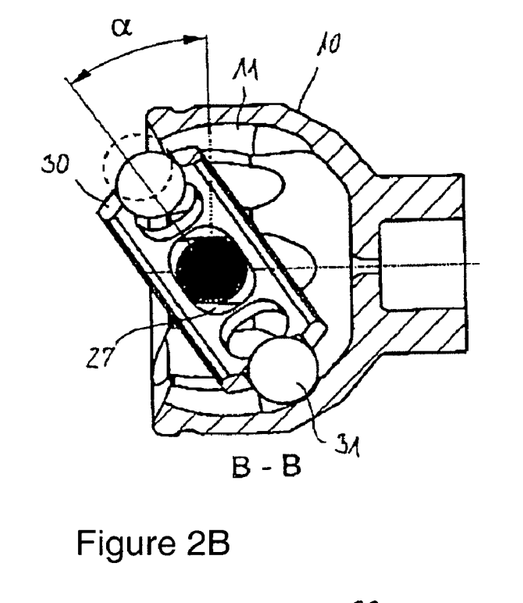
Figure 2C:
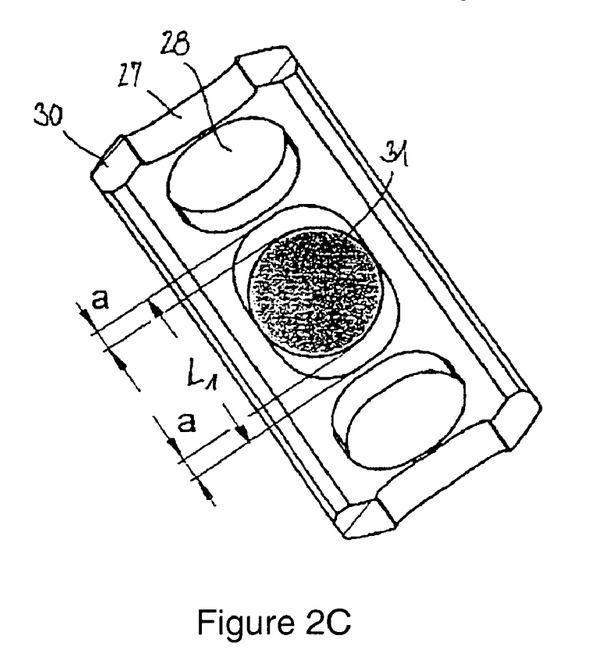
Figure 3A:
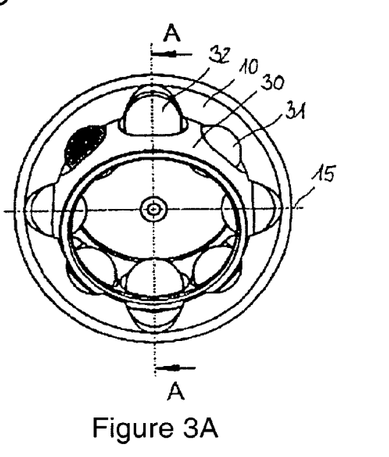
Figure 3B:
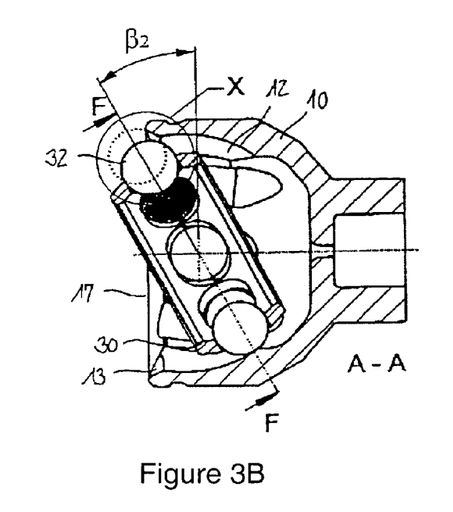
Figure 3C:
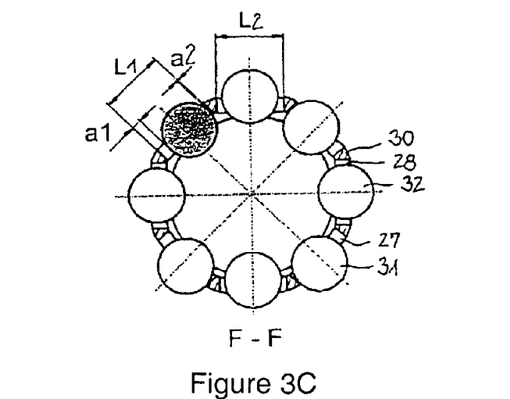
Figure 3D:
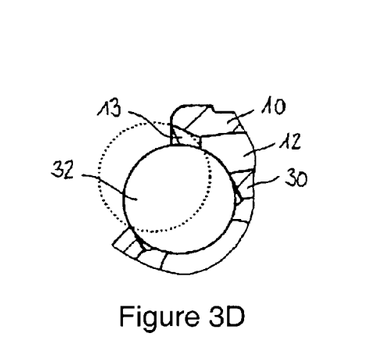

Below, the individual illustrations of FIG. 2 will be described jointly. FIG. 2 shows the joint of FIG. 1 during the conventional method of assembling the four balls 31 of the first group of balls by over-articulating the joint. To clarify the conditions and simplify the drawing, the inner joint part is not shown. The outer joint part 10 is shown in the sectional plane B-B of the first outer ball tracks 11. In the sectional plane, the ball cage 30 is articulated by an angle α relative to the outer joint part 10. The inner joint part (not illustrated) is articulated by the same angle α in the same plane relative to the ball cage 30. Three of the balls 31 have already been mounted in the way illustrated here. In the position as illustrated, the upper ball 31 positioned in the sectional plane can be inserted into a first cage window 27 projecting from the outer joint part 10. The first cage windows 27 alternate across the circumference with the second cage windows 28 which are dimensioned differently in the circumferential direction. As compared to the diameter of the balls of the first ball group 31, the cage windows 27 comprise an assembly play of 2a in the circumferential direction. The assembly play is sufficient for inserting the balls 32 of the second group of balls at a later stage by over-articulating the joint, as shown here, after the balls 31 of the first group of balls have already been inserted. The interesting aspect here is the insertion, as shown here, of the last one of the four balls 31 of the first group of balls, in the case of which last ball the ball cage 30 has been rotated around a transverse axis 14 relative to the outer joint part by the angle α, with the inner joint part (not illustrated here) being rotated once more by an angle α of the same size in the same direction relative to the ball cage 30 around the transverse axis 14.

In FIG. 3, the individual illustrations will be described jointly below. FIG. 3 shows the joint of FIG. 1 during assembly of the balls 32 of the second group of balls. The inventive joint is shown in the section A-A through the second outer ball tracks 12 of the outer joint part 10 while the balls 32 of the second group of balls are being mounted. The balls 31 of the first group of balls have already been inserted in accordance with the previous Figure. Again, for reasons of clarity, the inner joint part is not illustrated. The cage 30 is articulated relative to the outer joint part 10 by an angle β2 around a second transverse axis 15 rotated relative to the first transverse axis 14 by 45°. As in the previous figure, one of the balls 31 is shaded to aid in understanding the relative relationships between the various parts during assembly. The inner joint part (not illustrated) is articulated once again by the same angle β2 in the same direction relative to the cage 30. As can be seen from the detail X in FIG. 3D, the second outer ball tracks 12, at the aperture 17 of the outer joint part, comprise outwardly widened portions 13 which permit the balls 32 of the second group of balls to be inserted at a relatively small articulation angle β2 of the ball cage 30 relative to the outer joint part 10. In cross section, the widened portions 13 are adapted to the ball shape. These widened portions 13 act as non-contacting assembly regions in that they are not intended to contact the balls during normal joint operation. This means that a ball 32, while being inserted into a cage window 28 through a widened portion 13, is not controlled by the respective second pair of tracks 12, 22. Instead, the ball only gets in controlling contact with the respective second pair of tracks 12, 22 after the angle of articulation of the joint has been reduced from the over-articulated assembly position.

As a result of the widened, non-contacting assembly regions 13 at the ends of the second outer ball tracks 12, it is possible to insert the balls of a second group of balls 32 when the cage 30 is articulated only slightly beyond the maximum operating angle of articulation relative to the outer joint part 10. Advantageously, the first cage windows 27 for an already inserted first group of balls 31 need to be increased only slightly beyond their circumferential length L1 required for operational purposes. The cage windows 28 for the second group of balls 32 can comprise a shorter circumferential length L2 because the balls inside these windows are not displaced relative to one another during assembly. During assembly, as the balls 32 of the second group are positioned on the articulation axis of the joint on the one hand, and on the articulation plane of the joint on the other hand, they merely require the minimum length needed for articulation purposes within the operating range of articulation. It is thus possible to widen the webs between the cage windows 27, 28 considerably, thereby increasing the strength of the cage in operation. The load bearing capacity of the joint is thus also increased.

The balls 32 which are each positioned centrally relative to their cage windows 28 only require windows of window length L2 which corresponds to the window length required for articulation purposes in the operating range of the joint. The length of the windows 27 for the balls 31 of the first group of balls has again been given as L1, with the assembly play on both sides corresponding to a1+a2=2a according to FIG. 2. The distance a2 can become zero, in which case a1=2a.

The embodiment shown thus provides a counter track joint with eight balls wherein the strength of the cage has been increased as compared to known designs. In particular, the present joint provides that, at an aperture 17 of the outer joint part 10, the second outer ball tracks 12 of the outer joint part 10 comprise widened, non-contacting assembly regions 13 for inserting second balls 32 into second cage windows 28 from the radial outside, while the first cage windows 27 are already fully filled with first balls 31 and with the second cage windows 28 axially projecting from the outer joint part 10 as a result of the joint being over-articulated.

The four first cage windows 27 associated with the first pairs of tracks 11, 21 can comprise a greater length (L1) in the circumferential direction than the four second cage window length (L2) associated with the second pairs of tracks 12, 22. The length (L2) can be adapted to the operating angle of articulation of the joint. In a further example which requires particularly large widened, non-contacting assembly regions, the lengths L1, L2 are adapted to the operating angle of articulation of the joint, but also include a small excess dimension which may be the same or different for each of L1 and L2. In this example, the assembly process is the same as described above, with one advantage being that, when the excess dimension is the same, the cage can be inserted without regard to window orientation, relative to the first and second pairs of tracks.

Figure 4A:
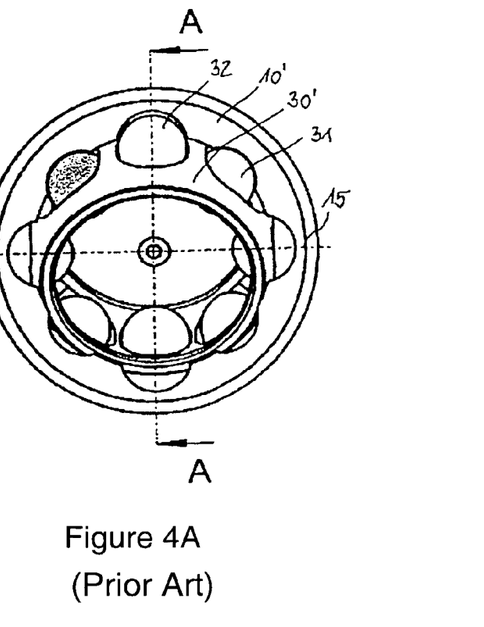
Figure 4B:
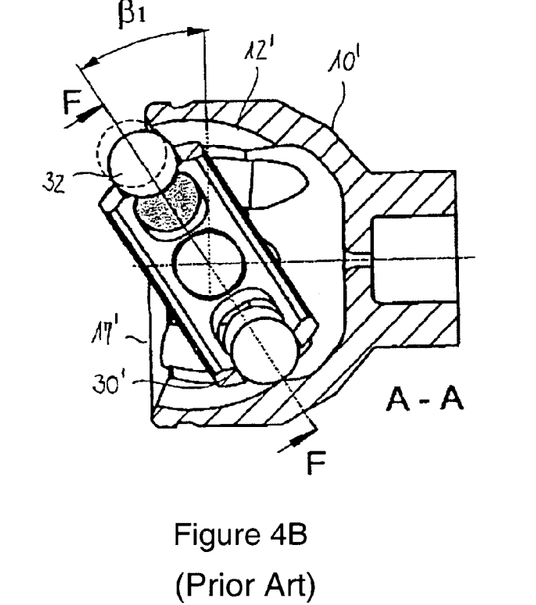
Figure 4C:
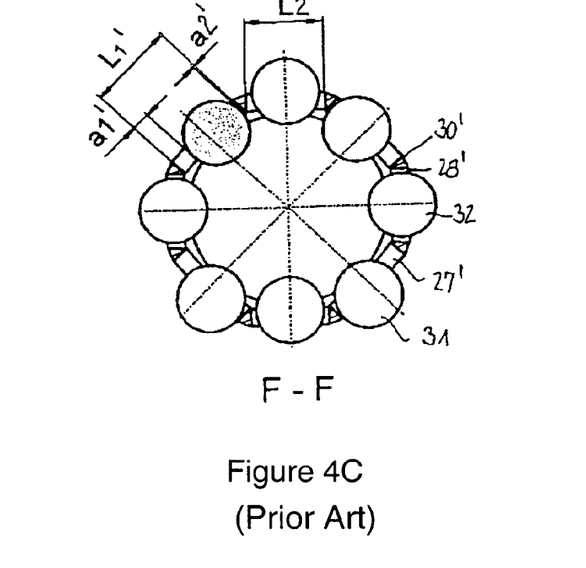

The different illustrations of FIG. 4 will be described jointly below. FIG. 4 substantially shows the same illustrations as FIG. 3, but with reference to a joint of the conventional type. The second outer ball tracks 12' do not comprise any outwardly widened portions at the aperture 17', so that the cage 30' has to be articulated at a greater angle β1 as compared to the previously shown angle β2 around the second transverse axis 15 rotated by 45° relative to the first transverse axis 14. Equally, the inner joint part (not shown) has to be articulated again by an identical angle β1 relative to the cage in the same direction to allow the insertion of the last one of the balls 32 of the second group of balls into its cage window 28'. This means that, with the length L2 of the second cage windows 28' for the second balls 32 remaining unchanged, it is necessary to provide the cage windows 27 for the balls 31 of the first group of balls with a greater circumferential length L1'. As a result, the webs between the ball windows 27', 28' become shorter in the circumferential direction, with the ball cage as a whole becoming weaker. Identical details have been given the same reference numbers as in FIG. 2, but these are provided with an apostrophe.

Figure 5A:
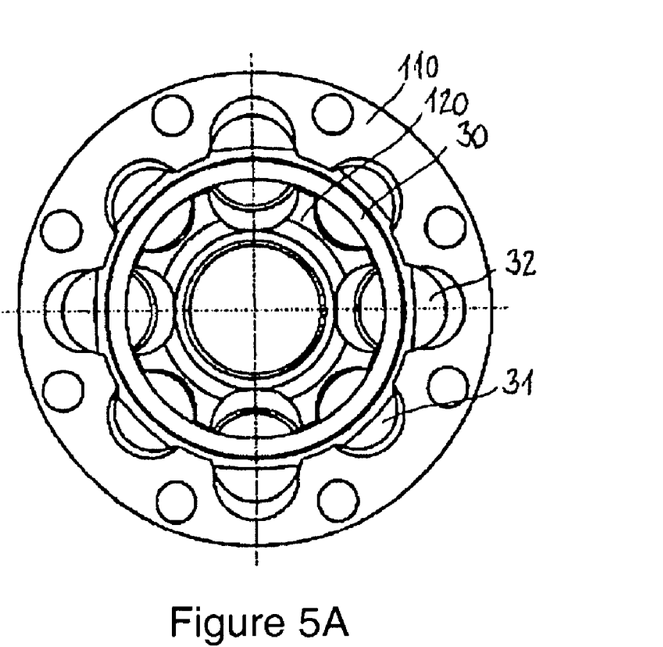
Figure 5B:
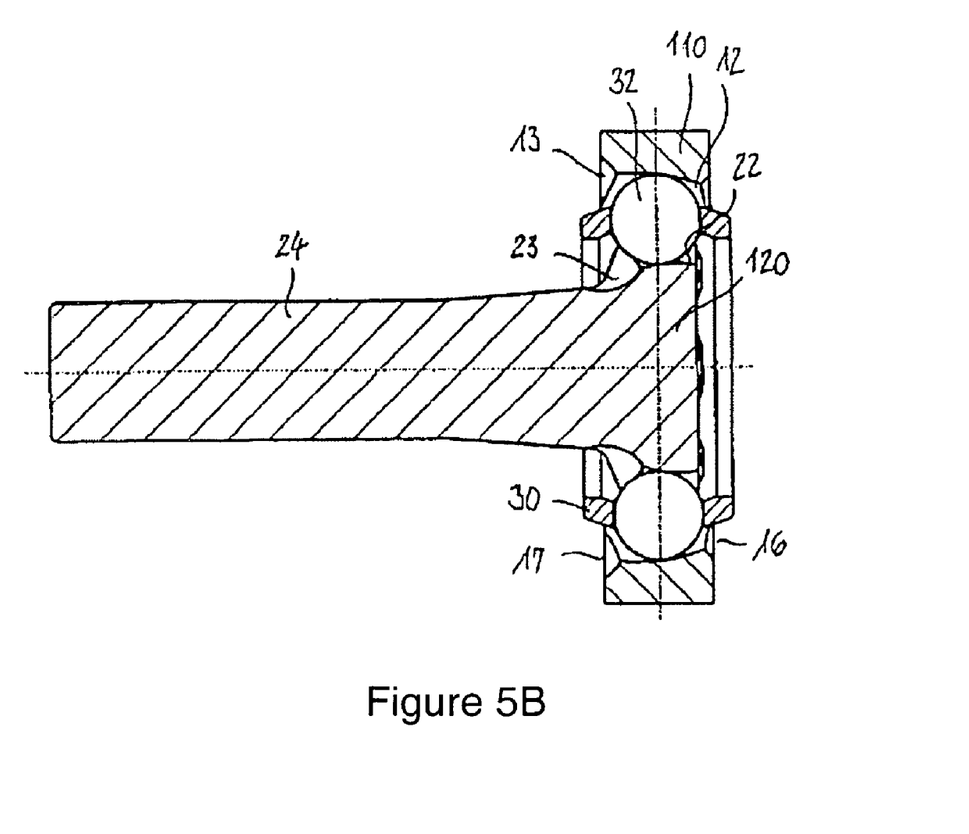

FIG. 5 shows another embodiment of the inventive joint in the form of a disc joint. That is, an outer joint part 110, at the end opposed to the aperture 17, comprises a second aperture 16 instead of a base 18. The section extends through a plane through the second outer ball tracks 12 and the second inner ball tracks 22, with the second outer ball tracks 12 showing the outwardly widened, non-contacting assembly portion 13. The inner joint part 120 is integrally connected to a driveshaft or journal 24. At the end of the aperture 17, the second inner ball tracks 22 of the inner joint part 120 comprise inwardly recessed track run-outs 23 which permit considerable over-articulation of the joint. Otherwise, identical details have been the same reference numbers as in FIGS. 1-3. To that extent, reference is made to the description of FIGS. 1-3.

Figure 6A:
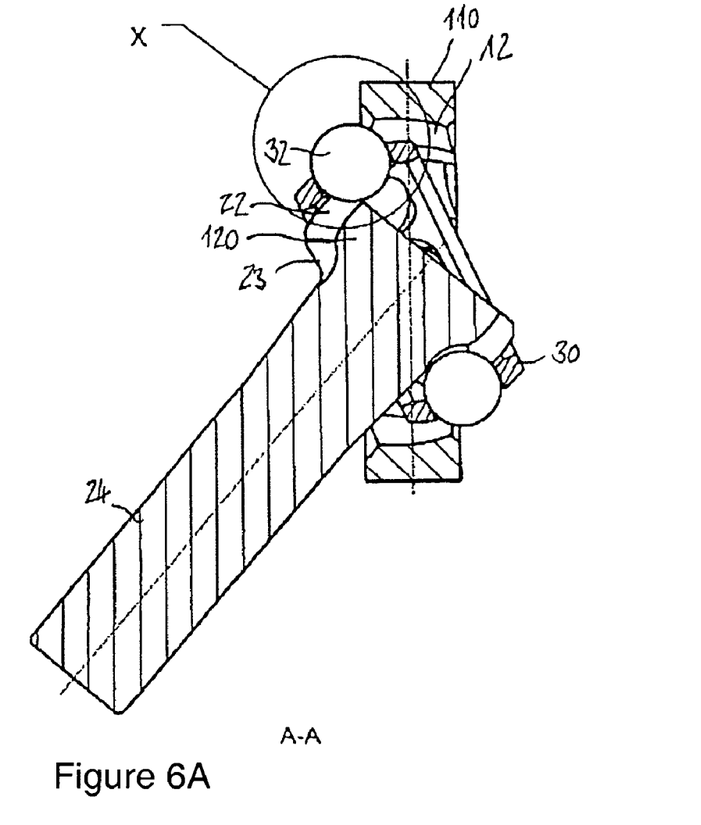
Figure 6B:
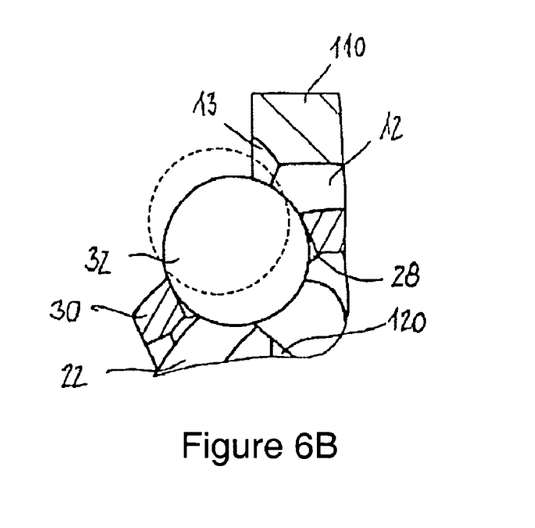

FIG. 6 shows the joint according to FIG. 5 during the assembly of the last ball 32 of the second group of balls, with the balls 31 of the first group of balls already having been mounted. The last ball 32 of the second group of balls can be inserted at a relatively reduced angle of articulation because of the outwardly widened, non-contacting assembly portion 13.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A counter track joint comprising:
  an outer joint part having four first outer tracks and four second outer tracks which alternate and are uniformly circumferentially distributed;
  an inner joint part having four first inner tracks and four second inner tracks which alternate and are uniformly circumferentially distributed, the first outer tracks and the first inner tracks forming first pairs of tracks which, when the joint is in the aligned condition, widen in a first direction (R1), and the second outer tracks and the second inner tracks forming second pairs of tracks which, when the joint is in the aligned condition, widen in an opposite direction (R2);

eight torque transmitting balls each held in respective first and second pairs of tracks; and a ball cage having four first and four second circumferentially distributed cage windows which each accommodate one of the balls and hold the balls, as a group, in one plane by way of their centers;

wherein at a first aperture of the outer joint part, the second outer tracks comprise widened non-contacting assembly regions for inserting the balls into the second cage windows from the radial outside, while the first cage windows are already fully filled with balls and with at least one of the second cage windows axially projecting from the outer joint part as a result of the joint being over-articulated.

2. A counter track joint according to claim 1, wherein the four first cage windows associated with the first pairs of tracks comprise a greater length (L1) in the circumferential direction than the four second cage windows which are associated with the second pairs of tracks and comprise a length (L2) which is adapted to the operating angle of articulation of the joint.

3. A counter track joint according to claim 2, wherein the outer joint part includes a base at its end which is axially opposed to the first aperture.

4. A joint according to claim 2, wherein the inner joint part is adapted to removably receive a driveshaft.

5. A counter track joint according to claim 2, wherein the outer joint part comprises a second aperture at its end which is axially opposed to the first aperture.

6. A counter track joint according to claim 5, comprising a driveshaft connected to the inner joint part and wherein the inner joint part, toward the end of the first aperture, comprises inwardly recessed track run-outs for the second inner tracks.

7. A counter track joint according to claim 1, wherein the first and second cage windows each comprise a respective circumferential length (L1, L2) adapted to the operating angle of articulation of the joint and an excess length.

8. A counter track joint according to claim 7, wherein the outer joint part includes a base at its end which is axially opposed to the first aperture.

9. A joint according to claim 7, wherein the inner joint part is adapted to removably receive a driveshaft.

10. A counter track joint according to claim 7, wherein the outer joint part comprises a second aperture at its end which is axially opposed to the first aperture.

11. A counter track joint according to claim 10, comprising a driveshaft connected to the inner joint part and wherein the inner joint part, toward the end of the first aperture, comprises inwardly recessed track run-outs for the second inner tracks.

12. A counter track joint according to claim 1, wherein the outer joint part includes a base at its end which is axially opposed to the first aperture.

13. A joint according to claim 12, wherein the inner joint part is adapted to removably receive a driveshaft.

14. A joint according to claim 1, wherein the inner joint part is adapted to removably receive a driveshaft.

15. A counter track joint according to claim 1, wherein the outer joint part comprises a second aperture at its end which is axially opposed to the first aperture.

16. A counter track joint according to claim 15, comprising a driveshaft connected to the inner joint part and wherein the inner joint part, toward the end of the first aperture, comprises inwardly recessed track run-outs for the second inner tracks.

17. In a counter track joint comprising an outer joint part having alternating and uniformly circumferentially distributed first outer tracks and second outer tracks; an inner joint part having alternating and uniformly circumferentially distributed first inner tracks and second inner tracks, the first outer tracks and first inner tracks forming first pairs of tracks which, when the joint is aligned, widen in a first direction (R1), the second outer tracks and second inner tracks forming second pairs of tracks which, when the joint is aligned, widen in an opposite direction (R2); eight balls; and a ball cage having four first and four second circumferentially distributed cage windows which each accommodate a ball and hold the balls in a common plane in the first and second pairs of tracks, a method of assembling the counter track joint comprising:
providing a widened, non-contacting assembly region in the second outer tracks at an aperture of the outer joint part;
over-articulating the joint about a first axis;
thereafter, inserting a ball into each of the first cage windows;
thereafter, over-articulating the joint about a second axis; and
thereafter, inserting a ball into each of the second cage windows while second cage windows axially project from the outer joint part.

18. A method according to claim 17, wherein the first cage windows comprise a circumferential length (L1), and the second cage windows comprise a circumferential length (L2) which is adapted to the operating angle of the joint, and L1 is greater than L2.

19. A method according to claim 17, wherein the first and second cage windows comprise equal circumferential lengths (L1, L2) each adapted to the operating angle of the joint and each include an excess dimension.

* * * * *